(12) United States Patent
Beyrard

(10) Patent No.: US 6,429,572 B1
(45) Date of Patent: Aug. 6, 2002

(54) ACTUATION DEVICE COMPRISING AT LEAST ONE PIEZOELECTRIC MOTOR AND A PART ABLE TO MOVE UNDER THE ACTION OF THE SAID PIEZOELECTRIC MOTOR

(75) Inventor: Norbert Beyrard, Neuilly sur Seine (FR)

(73) Assignee: Norbert Beyrard France, Paris (FR)

( * ) Notice: Subject to any disclaimer, the term of this patent is extended or adjusted under 35 U.S.C. 154(b) by 0 days.

(21) Appl. No.: 09/584,863

(22) Filed: Jun. 1, 2000

(30) Foreign Application Priority Data

Jun. 4, 1999 (FR) .............................. 99 07101

(51) Int. Cl.[7] .......................... H01L 41/08; H01L 41/04
(52) U.S. Cl. ..................................... 310/328
(58) Field of Search .................... 310/328, 323, 310/358, 332; H01L 41/09, 41/01; H02N 2/00

(56) References Cited

U.S. PATENT DOCUMENTS 5,049,775 A 9/1991 Smits ........................ 310/328
5,682,076 A * 10/1997 Zumeris ..................... 310/366
5,777,423 A * 7/1998 Zumeris ................. 310/316.01
6,064,140 A * 5/2000 Zumeris .................. 310/316.1

FOREIGN PATENT DOCUMENTS

| EP | 0633616 A2 | * | 5/1994 | ........... H01L/41/09 |
| JP | 62-254669 A | | 11/1987 | |
| JP | 04140074 A | * | 5/1992 | ........... H02N/2/00 |
| JP | 04 140074 A | | 5/1992 | |
| JP | 04161077 | * | 6/1992 | |
| JP | 40161077 A | * | 6/1992 | ........... H02N/2/00 |

\* cited by examiner

*Primary Examiner*—Tran Nguyen
*Assistant Examiner*—Karen Addison
(74) *Attorney, Agent, or Firm*—Nawrocki, Rooney & Sivertson, P.A.

(57) ABSTRACT

Apparatus for moving at least one micro-rack using at least one piezoelectric motor driven by an oscillatory source as the moving force. The piezoelectric motor drives an extensible part, which engages a series of dihedrons formed along one side of the micro-rack, to provide a desired extension.

11 Claims, 4 Drawing Sheets

ACTUATION DEVICE COMPRISING AT LEAST ONE PIEZOELECTRIC MOTOR AND A PART ABLE TO MOVE UNDER THE ACTION OF THE SAID PIEZOELECTRIC MOTOR

BACKGROUND OF THE INVENTION

1. Field of the Invention

The invention relates to an actuation device comprising at least one piezoelectric motor and a part able to move under the action of the said piezoelectric motor.

2. Description of the Related Art

The document EP-A-0 633 616 describes such a device in which the motor comprises a piezoelectric element which has several electrodes on its surface.

On one side of this piezoelectric element there is disposed a movement transmission part in contact with the movable part, and on the other side a spring.

By supplying the piezoelectric element suitably with power, the combination of the flexion of the piezoelectric element and the return force of the spring causes an elliptical rotation of the piezoelectric element, whose driving force is transmitted by friction to the movable part by means of the transmission part.

The problem with this type of motor is its complexity of use, notably with regard to the adjustment between the electrical power supply and the mechanical force applied by the spring.

This is because the formation of the elliptical rotation of the transmission part depends on this combination. The said part having to come into contact with the movable part only over the part of the cycle corresponding to the required direction of movement.

In addition, the transmission of the driving force by friction between the transmission part and the movable part causes a significant loss of energy.

This device also has a relatively large size having regard to its application, notably for electrical relays.

SUMMARY OF THE INVENTION

The invention therefore aims to remedy these drawbacks by providing an actuation device by means of a movable part moved by a piezoelectric motor which is of smaller size and simpler in its use than that of the prior art. In particular, the invention aims to provide such an actuation device whose functioning does not require the use of an external mechanical force, such as the one supplied by a spring, to cause the movement of the movable part.

To this end, the invention provides for an actuation device comprising at least one piezoelectric motor and a movable part, in which the said piezoelectric motor is formed by at least one piezoelectric element associated with means of supplying electric current for causing oscillatory deformations of the said piezoelectric element, and in which the movable part comprises at least one micro-rack intended to allow the transmission to the movable part of the driving force generated by the oscillatory deformations of the piezoelectric element.

The micro-rack has a surface on which, in part of the deformation cycle, the piezoelectric element exerts a force allowing the movement of the movable part and a second surface along which, over a second part of the deformation cycle, the piezoelectric element exerts substantially no force on the movable part.

For example, the micro-rack is formed by a succession of dihedrons, the height of which is of the same order of magnitude as the magnitude of the oscillatory deformations of the piezoelectric element.

A rod transmitting the deformations is associated with the piezoelectric element in order to be engaged and disengaged in the micro-rack when the piezoelectric element deforms in an oscillatory fashion.

In a first embodiment of the piezoelectric element, it deforms essentially by elongation.

A spring can then be associated with the transmission rod in order to facilitate the passage of the transmission rod from one dihedron to the adjacent dihedron during the movement of the movable part.

In a second embodiment of the piezoelectric element, it deforms essentially by elongation and flexion.

In a first embodiment, the device comprises a micro-rack and a piezoelectric motor, a return spring being associated with the movable element.

In a second embodiment, the device comprises two micro-racks and two piezoelectric motors.

In a variant of these two embodiments, the device also comprises means of locking the movable part in position.

BRIEF DESCRIPTION OF THE DRAWINGS

Other objects and advantages of the invention will emerge from the following description with reference to the accompanying drawings, illustrating various embodiments, drawings in which.

DETAILED DESCRIPTION OF THE PREFERRED EMBODIMENTS

Figure 1:
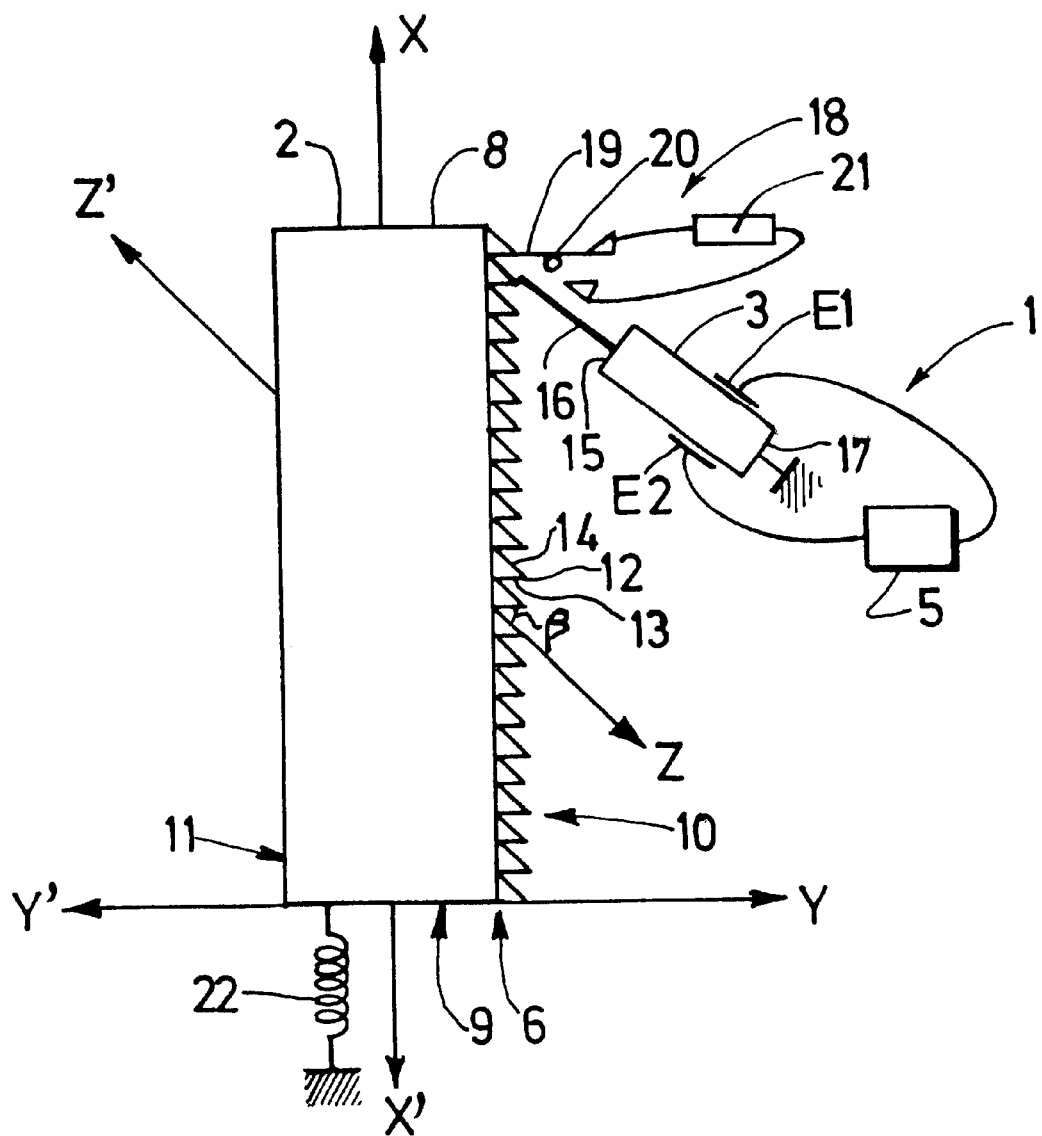
FIG. 1 is a simplified flat view of a first embodiment of an actuation device whose movable part comprises a micro-rack and is moved by a piezoelectric motor.

An actuation device comprises at least one piezoelectric motor 1 and a part 2 able to move under the action of the said piezoelectric motor 1.

The piezoelectric motor 1 comprises at least one element 3, 4 formed from piezoelectric material associated with an electrical power supply means 5 able to excite at least one resonance mode of the piezoelectric element 3, 4 so as to cause oscillatory deformations of the latter. For example, the frequency of the current delivered can be between 10 and 200 kHz and the voltage between 30 and 500 V.

The piezoelectric element 3, 4 is for example made from ceramic of the PZT (lead titanate and zirconate) type and in the form of a wafer in the shape of a right-angled parallelepiped whose length is greater than its thickness, for example around 10 times greater.

The movable part 2 is intended to move under the action of the driving force generated by the oscillatory deformations of the piezoelectric element 3, 4.

The transmission to the movable part 2 of the driving force generated by the oscillatory deformations of the piezoelectric element 3, 4 is effected by means of at least one micro-rack 6, 7, which is produced, for example by engraving, on the movable part 2.

The geometry of the micro-rack 6, 7 is such that it has a surface on which, in part of the deformation cycle, the piezoelectric element 3, 4 exerts a force allowing the movement of the movable part 2 and a second surface along which, over a second part of the deformation cycle, the piezoelectric element 3, 4 exerts substantially no force on the movable part 2.

In the embodiments depicted, the movable part 2 is in the form of a right-angled parallelepiped in shape and the micro-rack 6, 7 is disposed along one axis of the movable part 2. The movement of the movable part 2 is then linear.

In a variant (not shown), the movable part 2 is not in the form of a right-angled parallelepiped in shape and/or the micro-rack 6, 7 is not disposed along one axis of the movable part 2 so as to provide an actuation device in which the movement of the movable part is not linear. For example, the movable part 2 is cylindrical in shape and the micro-rack 6, 7 is disposed along its circumference so as to move the movable part 2 in rotation. In an additional example, the micro-rack 6, 7 is disposed along the periphery of a movable part 2 of any shape along a helix so as to move the movable part 2 simultaneously in rotation and in translation.

Such devices make it possible to actuate all kinds of systems by means of the movement of the movable part 2. Amongst the possible applications of the devices according to the invention is the actuation of electrical contacts in circuit-breaker contactors of the relay type.

A description will now be given, in relation to the accompanying figures, of two embodiments of an actuation device.

In the figures the axis XX' corresponds to the movement axis of the movable part 2 and the axis YY' is perpendicular, in the plane of the figures, to the axis XX'. These axes define, for the movable part 2, the terms: top end 8 (on the side X), bottom end 9 (on the side X'), right-hand face 10 (on the side Y) and left-hand face 14 (on the side Y').

Figure 2:
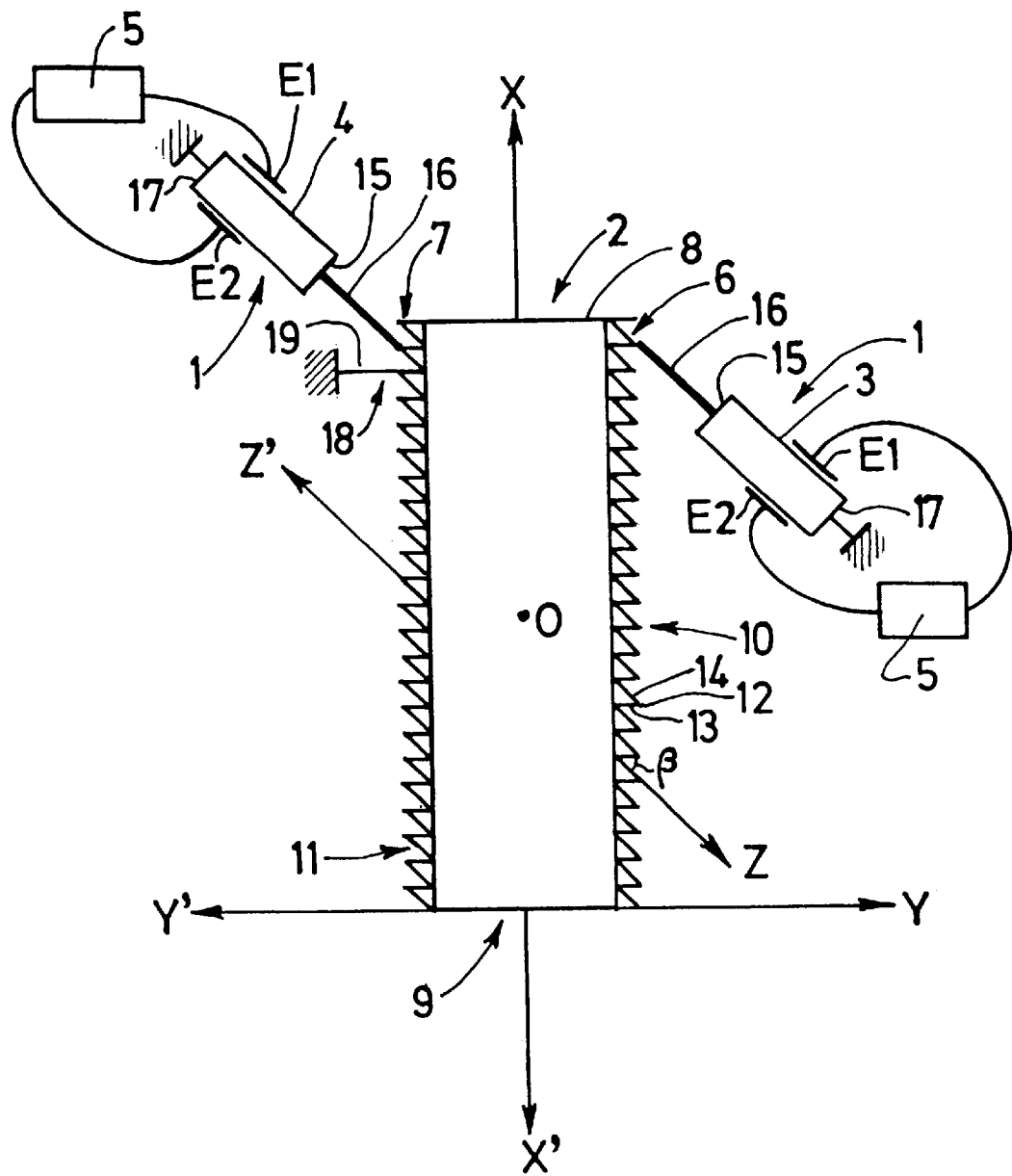
FIG. 2 is a simplified flat view of a second embodiment of an actuation device whose movable part comprises two micro-racks and is moved by two piezoelectric motors.
Figure 3:
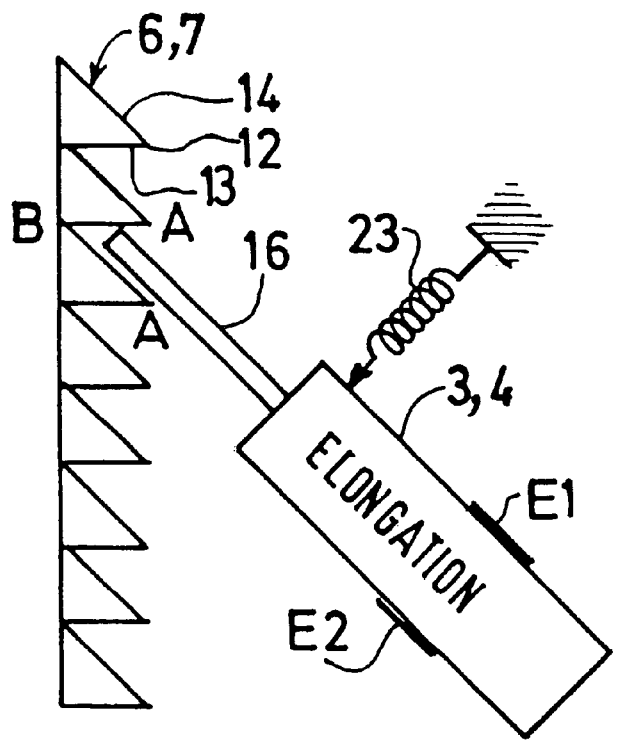
FIGS. 3 and 4 illustrate respectively the step of engagement and disengagement of the transmission rod associated with a first variant of a piezoelectric element deforming essentially by elongation.
Figure 4:
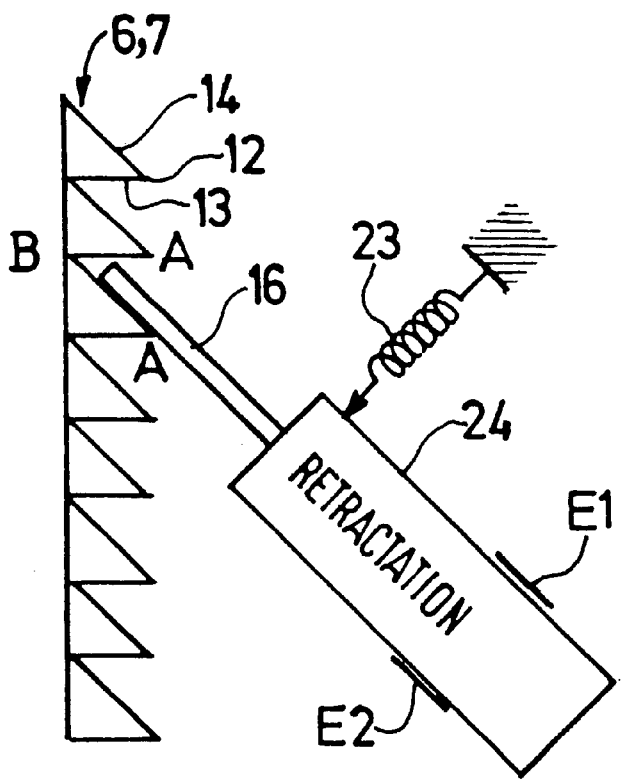
Figure 5:
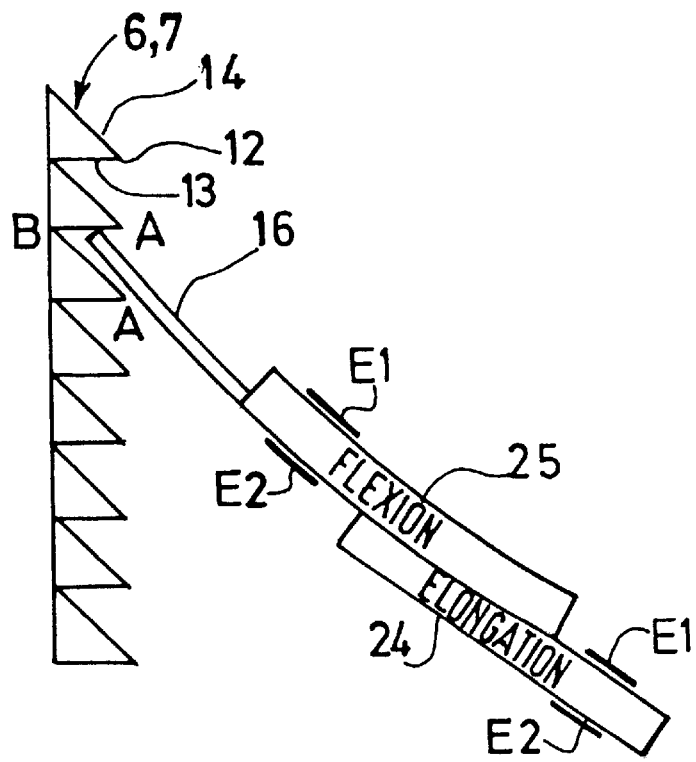
FIGS. 5 and 6 illustrate respectively the step of engagement and disengagement of the transmission rod associated with a second variant of a piezoelectric element deforming by elongation and by flexion.
Figure 6:
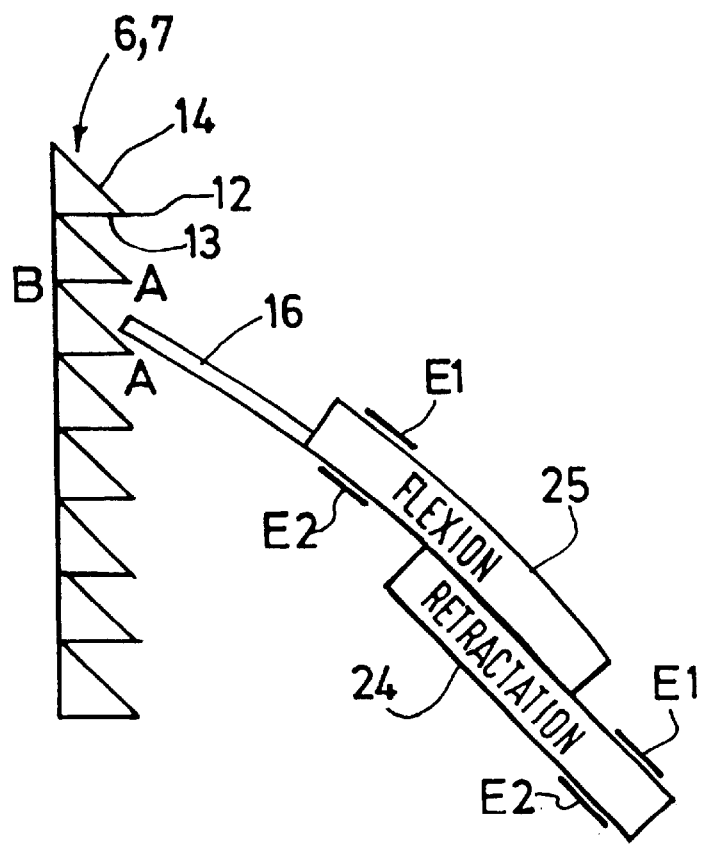

In the first embodiment depicted in FIG. 2, the movable part comprises a micro-rack 6 and is moved by a piezoelectric motor 1 whilst in the second embodiment depicted in FIG. 2 the movable part comprises two micro-racks 6, 7 and is moved by two piezoelectric motors 1.

The movable part 2, for example formed from ceramic material, is in the shape of a right-angled parallelepiped. On the right-hand face 10 of the movable part 2, a micro-rack 6 has been engraved in the direction XX'.

In the second embodiment, a second micro-rack 7 is formed on the left-hand face 11 of the movable part 2. The two micro-racks 6, 7 are arranged symmetrically with respect to the centre O of the movable part 2.

In the embodiments depicted, the direction XX' corresponds to the long length of the movable part 2.

The movement of the movable part is then linear in the direction XX' of propagation of the micro-rack 6, 7.

The micro-racks 6, 7 are formed by a succession of dihedrons 12 having a wall 13 perpendicular to the direction XX' (direction YY') and a second wall 14 forming an acute angle β (direction ZZ'), for example of around 45°, with the said first wall 13.

In the embodiments depicted, the piezoelectric elements 3, 4 are disposed respectively opposite the micro-racks 6, 7 in the direction ZZ', so as to be parallel to the said second walls 14.

An alternating current generator 5 adjustable for frequency and amplitude supplies the piezoelectric elements 3, 4 by means of two electrodes E1, E2 situated on each side of each of the piezoelectric elements 3, 4. For example, the two electrodes E1, E2 are disposed on each side of the smallest dimension of the piezoelectric element 3, 4.

On the end 14 of the piezoelectric elements 3, 4 which are situated opposite the movable part 2, there is disposed, for example by gluing or the like, a rod 16 for transmitting the oscillatory deformation of the piezoelectric element. The transmission rod 16 is formed, notably through its size, so as to be able to engage in and disengage from the micro-rack 6, 7 under the action of the deformations of the piezoelectric element 3, 4.

Although the embodiments depicted provide for the piezoelectric motors 1 to comprise such a transmission rod 16, it can be envisaged that it is directly the piezoelectric element 3, 4 which engages in the micro-rack 6, 7.

The piezoelectric elements 3, 4 are fixed by their end 17, opposite the transmission rod 16, to a support (not shown) so as to be fixed with respect to the movable part 2.

The relative arrangement of a piezoelectric element 3, 4 with a micro-rack 6, 7 is such that the oscillatory deformations of the piezoelectric element 3, 4 cause, over part of the deformation cycle, the engagement of the transmission rod 16 in the micro-rack 6, 7 and, over the other part of its cycle, its disengagement.

For example, the micro-rack 6, 7 is formed by a succession of dihedrons 12 which have a height (i.e. the distance AB in the direction YY' depicted in FIGS. 3 to 6) of the order of the magnitude of the oscillatory deformations of the piezoelectric element 3, 4. For example, the height of the dihedrons is between 0.5 and 5 $\mu$m.

A device 18 for locking in position can be provided for retaining the movable part 2 when the transmission rod 16 is disengaged from the micro-rack 6, 7 and in particular when the piezoelectric element 3, 4 is not fed with electric current.

For example, the locking device 18 is formed by a flexible blade 19, one end of which engages in the successive dihedrons 12 during the movement of the movable part 2. This blade 19 is sufficiently rigid to hold the movable part 2 in position when the transmission rod 16 is disengaged.

The locking device 18 can also be formed by plates rubbing on the movable part 2 if a small loss of energy through friction can be accepted.

The blade 19 is provided close to a piezoelectric motor 1 without however interfering with the oscillatory deformations of the piezoelectric element 3, 4 and the transmission rod 16 associated with it. For example, the blade 19 is situated opposite the dihedron 12 adjacent to the one in which the transmission rod 16 engages.

In the first embodiment, the blade 19 is mounted for rotation about an axis 20 and is actuated, for example by an electromagnet 27 or by a supplementary piezoelectric motor, respectively in an active position or in a passive position.

In the active position, the blade 19 engages in the successive dihedrons 12 so as to hold the movable part 2 in position when the transmission rod 16 is not engaged in a dihedron 12.

In the passive position, the blade 19 is turned through a sufficient angle to be moved away from the micro-rack 16 and therefore not to interfere with the movement of the movable part 2.

In a variant (not shown), the blade 19 can be actuated by two end of travel stops provided on each of the ends, respectively top 8 and bottom 9, of the movable part 2. The two stops and the blade 19 are situated on an axis offset with respect to the piezoelectric motor 1 so that these elements do not interfere with the piezoelectric motor 1 during the movement of the movable part 2. The locking device 18 then passes from an active position to a passive position and vice-versa at each end of travel of the transmission rod 16 in the micro-rack 6.

The principle of operation of such a motor is then to supply the piezoelectric element 3 with electric current so as to move the movable part 2 in the direction X. During this movement, the blade 19 is engaged (active position) in the micro-rack 6 so as to hold the movable part 2, in particular in the event of a break in the power supply.

A spring 22 is associated on the one hand with the bottom end 9 of the movable part 2 and on the other hand with a fixed support (not shown). When the movable part 2 moves in the direction X, the spring 22 progressively becomes taut.

At the end of travel of the movable part 2 in the direction X, the electrical power supply to the piezoelectric element 3 is cut off. The locking device 18 is then actuated towards a passive position so as to release the movable part 2.

The return of the movable part 2 in the direction X' is then provided by the mechanical force exerted by the spring 22 on the movable part 2. At the end of travel in the direction X', the locking device 18 is then actuated towards an active position. The piezoelectric element 3 can then once again be fed with electric current so as to provide a new movement of the movable part 2 in the direction X.

Thus a translational movement of the movable part 2 in two directions is obtained, in the direction X by electrically powering the piezoelectric element 3, the locking device 18 being in the active position, and in the direction X' by cutting off the electrical power supply to the piezoelectric element 3, the locking device 18 being in the passive position.

Where the locking device 18 is actuated by two stops, the tilting of the locking device 18 is achieved automatically at each end of travel of the movable part 2 in the direction X or in the direction X'. The electrical power supply to the piezoelectric element 3 is then cut off subsequently to the tilting of the locking device 18.

In the second embodiment depicted in FIG. 2, the end of the blade opposite to the micro-rack 6 is fixed to a support, for example the same support as the one to which the piezoelectric element 3 is fixed. In this configuration, the locking device 18 is always in the active position.

The translational movement in two directions is obtained by successively powering the first piezoelectric element 3 in order to obtain the translational movement in the direction X and then the second 4 for obtaining the translational movement in the direction X'.

This is because the two micro-racks 6, 7, notably by being symmetrical with respect to the centre O of the movable part 2, have profiles able to allow the movement of the movable part 2 each in a different direction.

A description will now be given, in relation to FIGS. 3 to 6, of two embodiments of the piezoelectric motor 1 as well as the operating principle of the transmission to the movable part 2 of the driving force generated by the deformations of the piezoelectric element 3, 4 by means of the micro-rack 6, 7.

In the description which follows, point A corresponds to an apex common to two adjacent dihedrons 12 and point B corresponds to a base common to two adjacent dihedrons 12.

In the first embodiment, the deformation of the piezoelectric element 3, 4 is essentially a deformation by elongation. The transmission rod then undergoes a periodic linear movement.

To this end, the material forming the piezoelectric element 3, 4 is chosen so as to undergo oscillatory deformations essentially by elongation at the excitation frequency used. Such materials are commercially available according to the required characteristics.

The principle of transmission of the driving force generated by the piezoelectric element 3, 4 deforming essentially by elongation is as follows.

In a first part of the deformation cycle (see FIG. 3), the piezoelectric element 3, 4 extends. The end of the transmission rod 16 then passes from close to point A to close to point B.

This passage from point A to point B takes place along the wall 13 of the dihedron 12 forming an angle β with the transmission rod 16 (direction XX'). During this passage, the transmission rod 16 extends and therefore pushes on the said wall 13 so as to move the movable part 2.

In a second part of the deformation cycle (see FIG. 4), the piezoelectric element 3, 4 retracts and the end of the transmission rod 16 passes from close to point B to close to point A.

This passage from point B to point A takes place along the wall 13 of the dihedron 12 parallel to the transmission rod 16 (direction ZZ'). During this passage, the transmission rod 16 retracts and therefore disengages from the micro-rack 6, 7 without causing a substantial movement of the movable part 2.

In this embodiment, the passage from one dihedron 12 to the other at point A can be facilitated by the action of a spring 23 exerted, on the piezoelectric element 3, 4 or directly on the transmission rod 16, in the reverse direction to the movement of the movable part 2, for example perpendicularly to the axis ZZ'.

The succession of the cycles of elongation and contraction of the piezoelectric element 3, 4 therefore causes a continuous linear movement of the movable part 2 in the direction X or respectively X'.

The speed of movement of the movable part 2 is then imposed by the frequency of the oscillatory deformations of the piezoelectric element 3, 4.

One means of becoming free from this constraint is, for example, to pulse the supply current to the piezoelectric element 3, 4 by means of an electronic control.

The pulsed current then gives rise to periods during which the piezoelectric element 3, 4 is fed with current and therefore during which the movable part 2 moves (active times), and periods where the current is zero and therefore when the movable part 2 does not move (dead time).

By controlling the frequency of the pulsing of the supply current to the piezoelectric element 3, 4, it is thus possible to regulate the mean speed of movement of the movable part 2. This is because, the greater the duration of the sum of the dead times, the smaller the mean speed of movement.

In the second embodiment, the deformation of the piezoelectric element 3, 4 is a deformation by elongation and by flexion. The transmission rod 16 is then driven in a periodic elliptical movement due to the combination between a linear movement and a sweeping movement caused respectively by the elongation and the periodic flexion of the piezoelectric element 3, 4.

To this end, the piezoelectric element 3, 4 is formed by two piezoelectric wafers 24, 25 pressed against each other over part of their respective surfaces, for example by bonding. Each of the two wafers 24, 25 comprises two electrodes E1, E2 situated on each side of their respective surface and an electrical supply means 5, for example different.

In a first variant, the two wafers 24, 25 are fed with a current of a given frequency. The two electrical supply means 5 then make it possible to supply two electrical signals with different voltages.

The material of the first wafer 24 is such that the frequency applied mainly excites its resonance mode for deformation by elongation whilst the material of the second wafer 25 is mainly excited in flexion at the frequency in question.

These two materials are for example made from PZT with different chemical compositions and/or structural properties.

In this variant embodiment, the transmission rod 16 describes an ellipse whose period depends on the frequency applied to the two wafers.

As in the previous embodiment, the speed of movement of the movable part 2 can be regulated by an electronic control for the pulse frequency of the supply current.

In a second variant, the two wafers 24, 25 are formed with the same ceramic material.

The second wafer 25 is fed with current at a first frequency for mainly exciting its resonance mode for deformation by flexion and the first wafer 24 is fed with current at a second frequency which is a harmonic of the first frequency for mainly exciting its resonance mode for deformation by elongation.

The synchronisation between the elongation movement and the flexion movement is then effected by means of an electronic control so that the transmission rod 16 periodically describes an ellipse.

The principle of transmission of the driving force generated by the piezoelectric element 3, 4 deforming essentially by elongation and flexion is then as follows.

In a first part of the deformation cycle (see FIG. 5), the piezoelectric element 3, 4 extends and flexes in the direction of the movement of the movable element 2. The end of the transmission rod 16 then passes from close to point A to close to point B.

This passage from point A to point B takes place along the wall 13 of the dihedron 12 forming an angle β with the transmission rod 16 (direction ZZ'). During this passage, the transmission rod 16 pushes on the said wall 13 so as to move the movable part 2.

In a second part of the deformation cycle (see FIG. 6), the piezoelectric element 3, 4 retracts and flexes in the opposite direction to the movement of the movable element 2. The end of the transmission rod 16 then passes from close to point B to close to point A.

This passage from point B to point A takes place along the wall 14 of the dihedron 12 parallel to the transmission rod 16 which is not deformed (direction ZZ'). During this passage, the transmission rod 16 disengages from the micro-rack 6, 7 without causing any substantial movement of the movable part 2.

The succession of deformation cycles of the piezoelectric element 3, 4 therefore causes a continuous linear movement of the movable part 2 in the direction X or respectively X'.

In this variant embodiment, the electronic control associated with the power supply means 5 is able on the one hand to regulate the speed of movement and on the other hand to synchronise the elongation movement of the wafer 24 and the flexion movement of the wafer 25.

If, for example, the frequency of deformation by flexion is lower than the frequency of deformation by elongation, the electronic control will pulse the current of the power supply means 5 so as to synchronise the two deformations at suitable moments for causing the movement of the movable part 2.

In addition, an actuation device according to the second embodiment allows, by virtue of the flexion of the piezoelectric element 3, 4, the passage of the transmission rod 16 from one dihedron 12 to the adjacent dihedron without the aid of an external mechanical force applied to the transmission rod 16.

I claim:

1. An actuation device comprising at least one piezoelectric motor and a movable part, in which the said piezoelectric motor is formed by at least one piezoelectric element associated with means for supplying electric current making it possible to cause oscillatory deformations of the said piezoelectric element, characterised in that the movable part comprises at least one micro-rack intended to allow the transmission to the movable part of the driving force generated by the oscillatory deformations of the piezoelectric element and the deformation of the piezoelectric element is a deformation essentially by elongation; wherein the micro-rack has a surface on which, in a part of the deformation cycle, a rod exerts a force allowing the movement of the movable part and a second surface along which, over a second part of the deformation cycle, the rod exerts substantially no force on the movable part.

2. A device according to claim 1, characterised in that the micro-rack is formed by a succession of dihedrons whose height is of the same order of magnitude as the magnitude of the oscillatory deformations of the piezoelectric element.

3. A device according to claim 1, characterised in that an electronic control able to control the speed of movement of the movable part (2) is associated with the electric current supply means (5).

4. A device according to claim 1, characterised in that the deformation of the piezoelectric element (3, 4) is a deformation essentially by elongation.

5. A device according to claim 4, characterised in that a spring (23) is associated with the transmission rod (16) in order to facilitate the passage of the transmission rod (16) from one dihedron (12) to the adjacent dihedron during the movement of the movable part (2).

6. A device according to claim 1, characterised in that the deformation of the piezoelectric element (3, 4) is a deformation essentially by elongation and flexion.

7. A device according to claim 6, characterised in that the electronic control associated with the power supply means is able to synchronise the deformation by elongation and the deformation by flexion of the piezoelectric element (3, 4).

8. A device according to claim 1, characterised in that it comprises the micro-rack (6) and a piezoelectric motor (1).

9. A device according to claim 8, characterised in that a return spring (22) is associated with the movable element (2).

10. A device according to claim 1, characterised in that it comprises two micro-racks (6, 7) and two piezoelectric motors (1).

11. A device according to claim 1, characterised in that it also comprises means (18) of locking the movable part (2) in position.

* * * * *